Feb. 21, 1933.  B. D. BEDFORD  1,898,932
ALTERNATING CURRENT GENERATOR
Original Filed Jan. 28, 1931
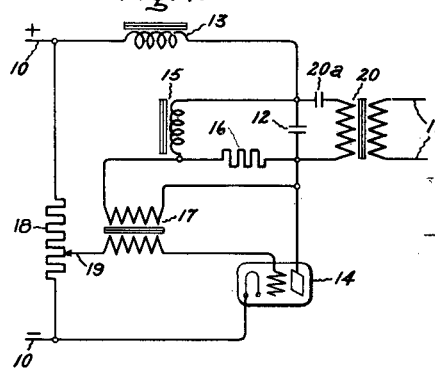
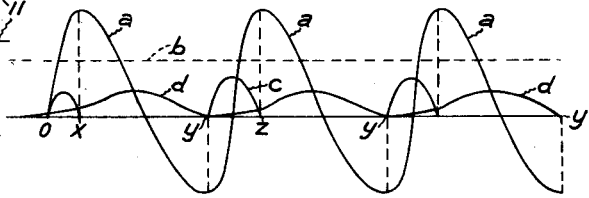
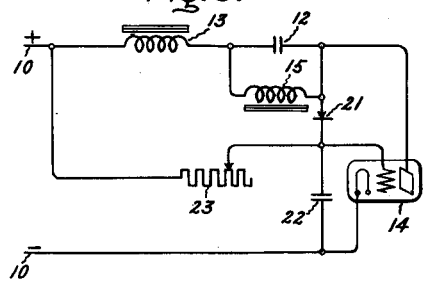
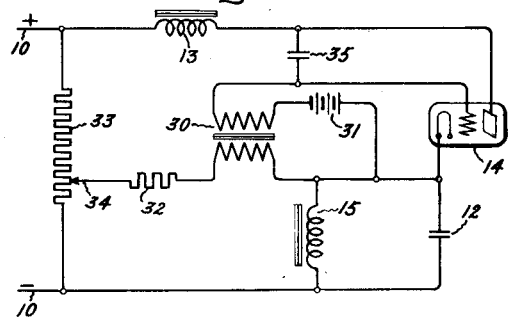
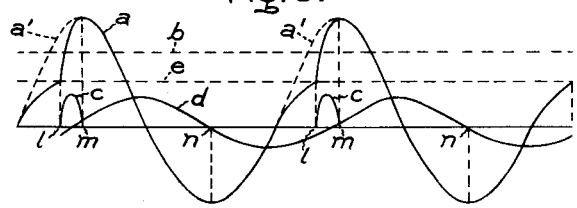
Inventor:
Burnice D. Bedford,
by Charles E. Tullar
His Attorney.

Patented Feb. 21, 1933

1,898,932

UNITED STATES PATENT OFFICE

BURNICE D. BEDFORD, OF SCHENECTADY, NEW YORK, ASSIGNOR TO GENERAL ELECTRIC COMPANY, A CORPORATION OF NEW YORK

ALTERNATING CURRENT GENERATOR

Application filed January 28, 1931, Serial No. 511,914. Renewed September 10, 1932.

My invention relates to electric circuits for generating periodic currents and more particularly to such circuits utilizing electric valves for generating alternating currents of substantially sine wave form.

Heretofore there have been devised various electric circuits including electric valves for generating periodic currents, usually of a relatively high frequency. Certain of these arrangements utilizing electric valves of the pure electron discharge type have the disadvantage that only limited power outputs may be obtained at ordinary operating voltages. Other arrangements utilizing electric valves of the vapor discharge type have the disadvantages of low efficiency and non-sinusoidal wave form.

It is an object of my invention to provide an improved electric circuit including an electric valve which will overcome the above mentioned disadvantages of the arrangements of the prior art and which will be simple and reliable in operation.

It is a further object of my invention to provide an electric circuit including an electric valve, preferably of the vapor electric type, which will generate an alternating current of substantially sine wave form.

It is a further object of my invention to provide an electric circuit including an electric valve for converting direct current to alternating current, or alternating current of one frequency into alternating current of another frequency, by means which include an oscillatory capacity circuit and means for limiting the time intervals during which energy is transferred from the source of current to the capacity circuit so as to obtain the maximum operating efficiency of the apparatus and at the same time obtain an alternating current of substantially sine wave form.

In accordance with my invention I provide a capacitor which is adapted to be charged from a source of current, either alternating or direct, through an electric valve and an oscillatory circuit. An oscillatory discharge circuit is also provided for the capacitor. A grid circuit is provided for the electric valve which is either connected to a point in one of the capacity circuits which is negative with respect to the cathode of the valve, or derives a negative potential from one of these capacity circuits for a predetermined proportion of the oscillatory discharge of the capacitors to maintain the electric valves nonconducting during this period and thus prevent transfer of energy from the source through the capacity circuit. This period during which the electric valve is maintained non-conducting is at least that required for the capacitor to discharge to zero potential and to be charged to its maximum potential in the opposite direction by the oscillatory energy of the discharge circuit and may be increased up to that time interval required to again charge the capacitor from the energy of the oscillatory circuit to approximately the potential of the source. The capacity charging circuit preferably has a considerably shorter natural period of oscillation than the discharge circuit so that as the point on the oscillatory discharge curve of the capacitor at which the electric valve is made conducting approaches the potential of the source, the time during which energy is transferred from the source to the capacity circuit approaches zero and the wave form of the oscillating current approaches that of a sine wave.

For a better understanding of my invention together with other further objects thereof, reference is had to the accompanying drawing and its scope will be pointed out in the appended claims. In the accompanying drawing Fig. 1 illustrates one embodiment of my invention for generating an alternating current of approximately sine wave form; Fig. 2 shows certain operating characteristics of the circuit illustrated in Fig. 1; Figs. 3 and 4 illustrate modifications of my invention by means of which a sine wave of alternating current may be more closely approximated and Fig. 5 shows certain operating characteristics of the circuits shown in Figs. 3 and 4.

Referring more particularly to Fig. 1 of the accompanying drawing, I have illustrated an arrangement for receiving energy from a circuit 10 energized with either direct or alternating current, converting it into alternating current having approximately a sine wave form, and delivering it to the receiving circuit 11. This arrangement comprises a capacitor 12 and a circuit for charging said capacitor from the circuit 10 comprising a reactor 13 and an electric valve 14 provided with an anode, a cathode and a control grid. Electric valve 14 may be of any of the several types well known in the art but I prefer to use a valve of the vapor electric discharge type in which the starting of current in the valve is controlled by the potential upon its grid but in which the current flowing in the valve can be interrupted only by reducing its anode potential below the critical value. A discharge circuit is also provided for the capacitor 12 including a reactor 15 and a resistor 16, the impedance of which is preferably small compared to that of the other circuit elements. The grid circuit of the valve 14 includes a positive bias potential derived from the resistor 18 and variable connection 19 and the secondary winding of a grid transformer the primary winding of which is connected across the resistor 16. The receiving circuit 11 may be connected to any of the several circuit elements but I prefer to connect it across the capacitor 12 by means of a transformer 20 in the primary circuit of which is connected a capacitor 20a to prevent any direct current component from saturating the core of the transformer 20.

The operation of the above described apparatus will be more clearly understood when considered in connection with Fig. 2, which illustrates some of its operating characteristics. It will be assumed that initially the circuit 10 is deenergized so that the grid and cathode of electric valve 14 are at the same potential. When the circuit 10 becomes energized, the electric valve 14 becomes conducting and the capacitor 12 is charged through the reactor 13 and the valve 14. Due to the inductance of the reactor 13, the charging circuit of the capacitor 12 is oscillatory so that it becomes charged to a potential substantially twice that of the circuit 10. At the same time a small current begins to build up in the reactor 15 and resistor 16, but, due to the larger time constant of this circuit, the current in it will not have built up to any substantial value by the time that the capacitor 12 becomes completely charged. As the current dies down in the charging circuit, so that no potential is supplied by the reactor 13, the anode of the valve 14 becomes negative with respect to its cathode with the result that the current is instantly interrupted. At the same time the capacitor 12 commences to discharge through the reactor 15 and the resistor 16. The potential drop across the resistor 16 due to this discharge current is impressed between the grid and the cathode of the valve 14 by means of the transformer 17, and this potential is of such a polarity as to render the grid of the valve 14 negative with respect to its cathode. This negative grid potential is maintained until the current has completely died out in the discharge circuit, that is, until the energy of the capacitor 12 has been completely transferred to the reactor 15 and back to the capacitor 12, charging the capacitor 12 in a direction opposite to that to which it was originally charged. As the capacitor 12 commences to discharge in the opposite direction the current through the resistor 16 is reversed and consequently the potential upon the grid of the valve 14 is made positive with respect to its cathode and the valve 14 becomes conducting. The capacitor 12 is again charged by the source 10 through the oscillatory charging circuit and this current is again interrupted when the capacitor 12 becomes charged to its maximum potential and this cycle is repeated indefinitely. Referring to Fig. 2, the curve $a$ represents the potential of the capacitor 12 and the straight line $b$ represents the constant potential of the circuit 10. It is seen that, during the time interval from $o$ to $x$, the potential of the capacitor 12 builds up very rapidly to its maximum value. At the point $x$ the capacitor becomes completely charged and then discharges at a slower rate, because of the larger time constant of the discharge circuit, during the time interval $x$ to $y$. At the time $y$ it becomes charged to its maximum potential of opposite polarity and, just as the current begins to reverse through the capacitor 12 and the resistor 16, the valve 14 is rendered conducting and the capacitor 12 becomes charged very rapidly from the source 10 during the time interval $y$ to $z$. The capacitor then again slowly discharges and the cycle is repeated. In this same Fig. 2, the curve $c$ represents the charging current flowing from the source 10 and the curve $d$ represents the current in the discharge circuit of the capacitor. It will be apparent to those skilled in the art that the frequency of the periodic current can be determined by the constants of the various circuit elements. From the curves of Fig. 2 it will be seen that the time constant of the charging circuit must be small enough to permit the capacitor 12 to become substantially completely charged before the current in the reactor 15 builds up to a value sufficient to maintain a discharge through the valve 14; that is, at the time $x$ and $z$ in the Fig. 2. With this arrangement this constitutes a limitation upon the approximation of the oscillating potential of the capacitor 12 to a sine wave. However, if the valve 14 is such that is requires a positive grid excitation to be made conducting, and if the positive bias of the grid circuit be removed or sufficiently reduced, the time at which the valve 14 is made conducting may be delayed to some time between $y$ and $z$, that is, until the current through the resistor 16 has built up to a value sufficient to impress a proper positive potential upon the grid of the valve 14. Under such a condition the oscillatory discharge of the capacitor 12 will persist for a greater portion of the complete cycle and the oscillating potential will more closely approximate a sine wave. However, the modifications of my invention illustrated in Figs. 3 and 4 are more readily adaptable for this delayed excitation of the electric valve.

In the arrangement of Fig. 3 the capacitor 12 is adapted to be charged by the source 10 through a reactor 13 and a valve 14 and to discharge through a reactor 15, as in the embodiment of Fig. 1. In this modification the resistor 16 may be omitted if desired. The grid of the valve 14 is connected to its anode through a unilaterally conducting device 21, such, for example, as a contact rectifier. The grid is also connected to the cathode of the valve 14 through a capacitor 22. A circuit for charging the capacitor 22 from the source 10 includes the variable resistor 23 which preferably has a very high resistance. As in the arrangement of Fig. 1, a receiving circuit may be energized across any of the several circuit elements, but is preferably connected across capacitor 12. The operation of this arrangement is similar to that described in connection with Fig. 1. When the anode of the valve 14 becomes negative due to the oscillatory charging circuit of the capacitor 12, the grid is also made negative through the unilaterally conducting device 21, and the capacitor 22 is charged to a negative potential. When the capacitor 12 commences to discharge through the reactor 15 therefore, the valve 14 is maintained nonconducting because of the negative charge upon its grid. However, the negative charge on the capacitor 22 slowly leaks off through the resistor 23 and this capacitor becomes charged to a positive potential. As soon as the grid reaches the proper potential, the valve 14 becomes conducting and the cycle is repeated. By proper adjustment of the value of the resistor 23, the valve 14 may be made conducting at any desired point in the oscillatory discharge of capacitor 12. In order to secure the closest approximation to a sine wave, it is desirable that the excitation of the valve 14 be delayed to a point in the oscillatory discharge of the capacitor 12 at which the capacitor 12 is again charged to a potential of the same polarity as that to which it was charged by the source. This point is shown at the time 1 in the curves of Fig. 5 in which the corresponding letters refer to the corresponding curves of Fig. 2. The length of time during which this excitation of the valve 14 may be delayed is limited by the amount of energy which must be received from the source 10 in order to maintain the circuit in operation, which, in turn, depends upon the losses in the circuit and the energy subtracted from the receiving circuit. However, if the circuit is utilized to generate a potential to drive the grids of an electric power converting apparatus utilizing electric valves, the amount of power drawn by the receiving circuit may be reduced to a minimum and the point 1 may very closely approach the point in the oscillatory discharge of the capacitor at which its potential is equal to the potential of the source 10. This potential at which the valve is adapted to be excited is noted by the line $e$ in Fig. 5.

In the modification of my invention illustrated in Fig. 4, the capacitor 12 is adapted to be charged from the source 10 through the reactor 13 and the valve 14 and to discharge through the reactor 15 as in the above described arrangement. In this modification, however, the grid of the electric valve 14 is connected to its cathode through a negative bias battery 31 and the secondary winding of a saturating transformer 30. The primary winding of the transformer 30 includes a current limiting resistor 32, the potential across the reactor 15, and a source of constant potential which may be derived from a battery or, as shown, from a potentiometer comprising the resistor 33 connected across the source 10 and a variable connection 34. A small capacitor 35 is connected between the anode and the grid of the valve 14 to aid in the starting of the arrangement. A receiving circuit may be connected across any of the several circuit elements, preferably the capacitor 12. The operation of this arrangement is similar to that of the apparatus described above with the exception of the means for obtaining the proper grid excitation of the valve 14. When the circuit 10 is energized the charging current of the capacitors 35 and 12 will flow through the secondary winding of the grid transformer 30 and the negative bias battery 31 in the grid circuit. The potential drop across the secondary winding of the transformer 30 will be in a direction opposite to that of the negative bias battery 31 and sufficient to overcome it and render the valve 14 conducting. The capacitor 12 will be charged from the source 10 as in the above cases and when completely charged will interrupt the current in electric valve 14. The capacitor 12 will now discharge through the reactor 15 and this discharge will continue to such a point that the potential of the capacitor 12 is of the same polarity as that to which it was originally charged and equal in magnitude to the potential in the primary circuit of the transformer 30 derived from the potentiometer 33. As soon as this potential is passed, the current through the primary winding of the transformer 30 reverses and, since this transformer is operating considerably above saturation, a short positive impulse of positive potential will be induced in the secondary winding sufficient to overcome the negative bias of the battery 31 and to render the valve 14 conducting. The cycle will then be repeated indefinitely. This potential at which the valve is rendered conducting, that is the potential derived from the potentiometer 33, is represented by the line e in Fig. 5, while the other curves represent the same characteristics as described in connection with Fig. 3.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. Apparatus for generating a periodic current approximating a sine wave form comprising a source of current, a capacitor, an oscillatory charging circuit for said capacitor including an electric valve, an oscillatory discharging circuit for said capacitor, and means for maintaining said valve non-conducting during a predetermined portion of the oscillatory discharge of said capacitor.

2. Apparatus for generating a periodic current approximating a sine wave form comprising a source of current, a capacitor, an oscillatory charging circuit for said capacitor including an electric valve, an oscillatory discharging circuit for said capacitor having a lower natural period of oscillation than said charging circuit, and means for maintaining said valve non-conducting during the oscillatory discharge of said capacitor at least until it reaches its maximum potential of a polarity opposite to that to which it is charged by said source.

3. Apparatus for generating a periodic current of substantially sine wave form comprising a source of current, a capacitor, an oscillatory charging circuit for said capacitor including an electric valve, an oscillatory discharging circuit for said capacitor including an inductance, and means for maintaining said valve non-conducting during the oscillatory discharge of said capacitor until after said capacitor has been charged to a maximum potential of a polarity opposite to that to which it is charged by said source, by the energy stored in said inductance.

4. Apparatus for generating a periodic current approximating a sine wave form comprising a source of current, a capacitor, an oscillatory charging circuit for said capacitor, an oscillatory discharging circuit for said capacitor, an electric valve, provided with an anode, a cathode, and a control grid, connected only in said charging circuit, and means for impressing upon said control grid for a predetermined portion of the oscillatory discharge of said capacitor, a negative potential derived from one of said circuits.

5. Apparatus for generating a periodic current approximating a sine wave form comprising a source of current, a capacitor, an oscillatory charging circuit for said capacitor including an electric valve, an oscillatory discharging circuit for said capacitor including a resistor, and means dependent upon the potential across said resistor for controlling the conductivity of said valve.

6. Apparatus for generating a periodic current approximating a sine wave form comprising a source of current, a capacitor, an oscillatory charging circuit for said capacitor including an electric valve, an oscillatory discharging circuit for said capacitor including a resistor, and means responsive to a reversal of current in said resistor for rendering said valve conducting.

7. Apparatus for generating a periodic current approximating a sine wave form comprising a source of current, a capacitor, an oscillatory charging circuit for said capacitor including an electric valve provided with a control grid, an oscillatory discharging circuit for said capacitor including a resistor, and means for impressing the potential across said resistor upon said control grid to maintain said valve non-conducting during the oscillatory discharge of said capacitor.

8. Apparatus for generating a periodic current of substantially sine wave form comprising a source of current, a circuit connected across said source including a serially connected inductance, a capacitor, and a vapor electric valve provided with an anode, a cathode, and a control grid, a discharge circuit for said capacitor connected in parallel thereto comprising a resistance and an inductance, and means for impressing between said cathode and said grid a potential dependent upon the potential across said resistor.

9. Apparatus for generating a periodic current of substantially sine wave form comprising a source of current, a circuit connected across said source including a serially connected inductance, a capacitor, and a vapor electric valve provided with an anode, a cathode, and a control grid, a discharge circuit for said capacitor connected in parallel thereto comprising a resistance and an inductance, a grid transformer having a primary winding connected across said resistor, and a circuit connecting the grid and cathode of said valve including the secondary winding of said grid transformer and a source of positive balance potential.

10. Apparatus for generating a periodic current of substantially sine wave form comprising a source of current, a capacitor, an oscillatory charging circuit for said capacitor including an electric valve, an oscillatory discharging circuit for said capacitor including an inductance, and means for rendering said valve nonconducting during the oscillatory discharge of said capacitor until said capacitor has again been charged to a predetermined potential of the same polarity as that to which it is charged by said source by the energy stored in said inductance.

11. Apparatus for producing a periodic current of substantially sine wave form comprising a source of current, a capacitor, an oscillatory charging circuit for said capacitor, an oscillatory discharging circuit for said capacitor, an electric valve, provided with a control element, connected in only said charging circuit, and a connection from said control element to a point in one of said circuits for maintaining said valve nonconducting for a predetermined portion of the oscillatory discharge of said capacitor.

12. Apparatus for generating a periodic current of substantially sine wave form comprising a source of current, a capacitor, an oscillatory charging circuit for said capacitor, an oscillatory discharging circuit for said capacitor, an electric valve, provided with an anode, a cathode, and a control grid, connected in only said charging circuit, and a connection from said control grid to a point in one of said circuits negative with respect to said cathode for a predetermined portion of the oscillatory discharge of said capacitor to maintain said valve nonconducting for said period.

13. Apparatus for generating a periodic current of substantially sine wave form comprising a source of current, a capacitor, an oscillatory charging circuit for said capacitor including an electric valve provided with an anode, a cathode, and a control grid, an oscillatory discharging circuit for said capacitor, means for impressing upon said grid the negative potential of said anode due to the oscillatory charge of said capacitor, and means for maintaining said negative charge on said grid until a predetermined point in the oscillatory discharge of said capacitor.

14. Apparatus for generating a periodic current of substantially sine wave form comprising a source of current, a capacitor, an oscillatory charging circuit for said capacitor including an electric valve provided with an anode, a cathode, and a control grid, an oscillatory discharging circuit for said capacitor, a unilaterally conductive device so connected between said grid and said anode as to conduct only a negative charge to said grid when said anode is negative, a second capacitor associated with said grid to maintain said negative charge, and a leakage path for said second capacitor whereby said valve is maintained nonconducting until a predetermined point in the oscillatory discharge of said first mentioned capacitor.

15. Apparatus for generating a periodic current of substantially sine wave form comprising a source of current, a circuit connected across said source including a serially connected inductance, a capacitor, an electric valve provided with an anode, a cathode, and a control grid, a second inductance connected in parallel to said capacitor, a circuit between said anode and said grid including a unilaterally conductive device connected to conduct only a negative charge from said anode to said grid, a second capacitor connected between said cathode and said grid, and an adjustable resistor connected from the junction of said grid and second capacitor to that side of said source connected to said first mentioned inductance.

16. Apparatus for generating a periodic current of substantially sine wave form comprising a source of current, a capacitor, an oscillatory charging circuit for said capacitor including a vapor electric valve provided with an anode, a cathode, and a control grid, an oscillatory discharging circuit for said capacitor, a circuit connecting said grid and cathode including a source of negative bias potential to normally keep said valve nonconducting, and means for momentarily overcoming said bias with a positive potential impulse at a predetermined point in the oscillatory discharge of said capacitor.

17. Apparatus for generating a periodic current of substantially sine wave form comprising a source of current, a circuit connected across said source including an inductance, a vapor electric valve, provided with an anode, a cathode, and a control grid, and a capacitor, an inductance connected in parallel to said capacitor, a saturating grid transformer, a circuit connecting said grid and said cathode including a negative bias battery and the secondary winding of said grid transformer, and a circuit for energizing the primary winding of said grid transformer including a source of constant unidirectional potential and the potential across said capacitor.

In witness whereof I have hereunto set my hand.

BURNICE D. BEDFORD.

CERTIFICATE OF CORRECTION.

Patent No. 1,898,932. February 21, 1933.

BURNICE D. BEDFORD.

It is hereby certified that error appears in the printed specification of the above numbered patent requiring correction as follows: Page 2, line 82, for "carthode" read "cathode", and line 127, for "is" second occurence, read "it"; page 5, line 2, claim 9, for "balance" read "bias"; and that the said Letters Patent should be read with these corrections therein that the same may conform to the record of the case in the Patent Office.

Signed and sealed this 9th day of May, A. D. 1933.

M. J. Moore.

(Seal) Acting Commissioner of Patents.